United States Patent Office 2,978,342
Patented Apr. 4, 1961

2,978,342
ANTI-STRIPPING ADDITIVE FOR ASPHALTS

Jean A. A. Lefebvre, Sarnia, Ontario, Canada, assignor to Esso Research and Engineering Company, a corporation of Delaware No Drawing. Filed Aug. 27, 1957, Ser. No. 680,628

6 Claims. (Cl. 106—123)

This invention relates to the coating of mineral aggregates with different types of bituminous compositions whereby firm permanent bonds between the coatings and the aggregates are obtained with consequent increase in the length of the life of the finished products.

It has heretofore been required to dry mineral aggregates which are to be bonded by means of asphalts as it is very difficult to obtain a uniform coating of the asphalt in the presence of water. On mixing a wet mineral aggregate and an untreated asphalt, the mineral aggregate is not properly coated. The partially coated aggregate is easily stripped of the asphalt, especially if there is an early exposure to the action of water, that is, a heavy rainfall occurring shortly after the laying operation.

One of the objects of the present invention is to permit the coating of the surfaces of damp or wet aggregates with a bituminous composition in such a manner that the coating obtained is satisfactory and produces a firmly bonded mass.

A further object of this invention is to prepare a paving mixture bonded with asphalt in which the asphalt coating when applied to either dry or wet aggregate is not readily displaced or stripped when subjected to the action of water.

Other objects of the invention will be readily understood on reading the following description of the invention.

It has been proposed that wetting agents, such as heavy metal salts of fatty acids, naphthenic acids or sulfonic acids prepared in the refining of petroleum oils be incorporated in an asphalt to increase the adhesivity (i.e. resistance to displacement by water) and wetting power of the said asphalt. A substantial increase in the wetting power of asphalt and also in the adhesivity of the asphalt to the mineral aggregate is obtained by the addition of such heavy metal fatty acid salts, but if the mineral aggregate is wet, a satisfactory asphalt coating is not always obtained, that is, a coating that will satisfactorily cover the wet stone and also resist subsequent displacement by water. This wetting power and adhesivity vary according to the mineral aggregate on which the asphalt is applied. For example, it has been found that certain trap rocks are not readily coated with treated asphalt when wet and the resulting coating, in any case, does not have sufficient adhesivity to offer high resistance to subsequent stripping by the action of water.

It has now been found that alkaline earth metal salts of lignosulfonic acids are highly effective in improving the adhesion of asphalt to various aggregates in the presence of water. More particularly, it has been found that the addition of one to ten percent by weight of commercial calcium lignosulfonate to paving asphalt greatly improves the resistance to stripping by water of the treated asphalt from mineral aggregates. A similar improvement is also obtained when the asphalt is treated with one-quarter of one percent to five percent of an extract obtained by treating commercial calcium lignosulfonate is readily coated with alcohol or other suitable solvent. The mineral aggregate is readily coated with asphalt when the anti-stripping agent is incorporated therein, and the resulting coating generally shows a high resistance to stripping by water action. Under similar conditions, untreated asphalt when applied to dry aggregates will generally exhibit low resistance to stripping by water action, and when applied to a wet aggregate will generally fail to provide a satisfactory coating.

The anti-stripping agents of the present invention may be advantageously incorporated with the asphalt. The commerical calcium lignosulfonate may be blended in its powder form with the asphalt when the latter is heated to a sufficient temperature to permit a rapid solution of the active agent. Similarly, if the agents have been prepared in the extract liquid form, they are easily mixed with asphalt previously liquefied with a petroleum solvent or the application of heat.

Calcium lignosulfonate is readily available as a by-product of the pulp and paper industry, and is obtained in the acid sulfite process. Another type of lignosulfonate that may be employed in accordance with the present invention is magnesium lignosulfonate.

The anti-stripping action of the additive of the present invention is shown in the attached specific examples. Investigations have been carried out in accordance with the procedure suggested by the American Society for Test Materials in the 1955 edition of its standards on bituminous materials for highway construction, waterproofing, and roofing. The method consists in coating prewashed selected mineral aggregate of specified grading with 5.5 percent of the liquid or semi-liquid bitumen or 8.0 percent of emulsified asphalt. The aggregate and bituminous material are preheated when necessary to obtain satisfactory coating and the mixture may be subsequently cured, depending upon the bituminous material employed. The coated aggregate is immersed for 16 to 24 hours in distilled water of 6.0 to 7.0 pH at room temperature for liquid bitumens and at elevated temperatures (140° F.) for semi-solid and emulsified bituminous materials. The stripping resistance is reported as the percentage of the area of the aggregate on which the coating is retained.

The results given in Tables I, II and III show that both the commercial powder form of calcium lignosulfonate and the extract form are effective over a wide range of concentration.

The effectiveness of calcium lignosulfonate as compared to a wetting agent consisting of a commercial amine of heavy molecular weight is shown in Table IV.

An important problem in asphalt anti-stripping agents is the heat stability of the composition. Though initially many anti-stripping agents show desirable bonding characteristics, this is lost after exposure of the treated asphalt to elevated temperatures due to the insufficient heat stability of the anti-stripping agent. This lack of stability is principally exhibited by amines in presence of organic acids. The heat stability of calcium lignosulfonate when blended with paving asphalt was investigated. The data of Table V show only a very slight drop in effectiveness when the treated asphalt is maintained at 250° F. for a period of 24 hours.

It is understood that the anti-stripping agents of the present invention may be employed not only with straight-run asphalt but also with oxidized asphalt or cutback asphalt.

TABLE I

*Effect of the addition of 1% by weight of calcium lignosulfonate powder to 150–200 penetration asphalt on the stripping resistance of the asphalt by water from various mineral aggregates*

| Aggregate | Asphalt | Percentage of Total Area Of Aggregate Remaining Coated after 24 Hours In Water at 140° F. |
|---|---|---|
| Slag | Untreated | 30 |
| | Treated | 50 |
| Trap | Untreated | 75 |
| | Treated | 90 |
| Limestone | Untreated | 75 |
| | Treated | 85 |
| Gravel | Untreated | 85 |
| | Treated | 90 |

TABLE II

*Effect of the addition of calcium lignosulfonate extract to 120–150 penetration asphalt on the stripping resistance of the asphalt by water from crushed trap rock*

[Percentage of total area of aggregate remaining coated after 24 hours in water at 140° F.]

| Untreated Asphalt | Asphalt Treated With 0.26% Extract | Asphalt Treated With 1.0% Extract |
|---|---|---|
| 58 | 63 | 81 |

TABLE III

*Relative effectiveness of calcium lignosulfonate powder and extract on the stripping resistance of the asphalt by water from various aggregates*

[Percentage of total area of aggregate remaining coated after 24 hours in water at 140° F.]

| Trap Rock | | Crushed Gravel | |
|---|---|---|---|
| 1.0% Extract | 4.3% Powder | 1.0% Extract | 4.3% Powder |
| 98 | 96 | 90 | 95 |

TABLE IV

*Comparative effectiveness of calcium lignosulfonate and a highly effective amine as anti-stripping agents*

| Aggregate | Trap Rock | Limestone | Gravel |
|---|---|---|---|
| | Percentage of total area remaining coated after 24 hours in water at 140° F. | | |
| Asphalt untreated | 55 | 38 | 63 |
| Asphalt treated with 1% commercial amine | 100 | 94 | 99 |
| Asphalt treated with 1% calcium lignosulfonate extract | 94 | 96 | 92 |
| Asphalt treated with 10% calcium lignosulfonate powder | 98 | 94 | 96 |

TABLE V

*Effective on stripping test of heating 120–150 penetration asphalt treated with calcium lignosulfonate*

| | Percentage of total area of trap rock aggregate remaining coated after 24 hours in water at 140° F. | |
|---|---|---|
| | Heating Period at 250° F. | |
| | 0 Hours | 24 Hours |
| Asphalt treated with 1% calcium lignosulfonate extract | 95 | 91 |
| Asphalt treated with 10% calcium lignosulfonate powder | 86 | 79 |

What is claimed is:

1. An improved bituminous anti-stripping composition consisting essentially of a mixture of asphalt and from 1 to 10% by weight of an alkaline earth metal salt of lignosulfonic acid.

2. The composition of claim 1 wherein said anti-stripping agent is calcium lignosulfonate.

3. The composition of claim 1 wherein said anti-stripping agent is magnesium lignosulfonate.

4. An improved bituminous anti-stripping composition consisting essentially of a mixture of asphalt and from about 0.25 to about 5% by weight of an extract of calcium lignosulfonate.

5. An improved process for preparing bituminous anti-stripping compositions which comprises treating calcium lignosulfonate with a solvent to form an extract and incorporating from about 0.25 to 5% by weight of said extract in asphalt.

6. The process of claim 5 wherein said solvent is a low molecular weight alcohol.

References Cited in the file of this patent

UNITED STATES PATENTS

| | | |
|---|---|---|
| 1,221,259 | Woddrop | Apr. 3, 1917 |
| 1,246,808 | Ellis | Nov. 13, 1917 |
| 1,311,220 | Ellis | July 29, 1919 |
| 1,662,299 | Coughlin | Mar. 13, 1928 |
| 2,673,164 | Hughes et al. | May 23, 1954 |
| 2,699,998 | Morton | Jan. 18, 1955 |
| 2,789,097 | Rappleyea | Apr. 16, 1957 |